(12) United States Patent
Ogata et al.

(10) Patent No.: US 12,032,757 B2
(45) Date of Patent: Jul. 9, 2024

(54) ELECTRONIC PEN WITH ELECTRONIC PEN BODY PART HAVING BUTTON SWITCH AND PUSHER PART INSERTED INTO INSERTION PART FORMED IN OPERATOR

(71) Applicant: Wacom Co., Ltd., Saitama (JP)

(72) Inventors: Mamoru Ogata, Saitama (JP); Takenori Kaneda, Saitama (JP); Kenichi Ninomiya, Saitama (JP); Takayuki Arai, Saitama (JP); Kohei Tanaka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/177,606

(22) Filed: Mar. 2, 2023

(65) Prior Publication Data

US 2023/0205330 A1    Jun. 29, 2023

Related U.S. Application Data

(63) Continuation of application No. PCT/JP2021/029584, filed on Aug. 11, 2021.

(30) Foreign Application Priority Data

Sep. 11, 2020 (JP) ................................ 2020-152725

(51) Int. Cl.
*G06F 3/0354* (2013.01)
*G06F 3/038* (2013.01)
(52) U.S. Cl.
CPC ........ *G06F 3/03545* (2013.01); *G06F 3/0383* (2013.01)

(58) Field of Classification Search
CPC .......................... G06F 3/03545; G06F 3/0383
See application file for complete search history.

(56) References Cited

U.S. PATENT DOCUMENTS

| 5,895,895 | A | * | 4/1999 | Ono ..................... G06F 3/03545 178/19.03 |
| 2019/0187856 | A1 | * | 6/2019 | Bruwer ................... G06F 3/046 |
| 2020/0209992 | A1 | * | 7/2020 | Kwak ................. G06F 3/03545 |

FOREIGN PATENT DOCUMENTS

WO    WO 2017043214 A1    3/2017

OTHER PUBLICATIONS

International Search Report, mailed Sep. 21, 2021, for International Patent Application No. PCT/JP2021/029584. (5 pages) (with English Translation).

* cited by examiner

*Primary Examiner* — Afroza Chowdhury
(74) *Attorney, Agent, or Firm* — Seed IP Law Group LLP (57) ABSTRACT

An object of the present disclosure is to provide an electronic pen that is excellent in portability by being reduced in size, that has a side switch functioning stably, and that is easy to maintain. A pusher part of an electronic pen body part is inserted into an insertion part of an operator, and the operator is thus attached to the pusher part of the electronic pen body part in a state of being fitted into an operator opening part of an outer casing. The operator opening part of the outer casing is formed in a side surface thereof at a position corresponding to a button switch of the electronic pen body part being loaded into the outer casing and placed at a fixed position. Therefore, the button switch can reliably be depressed through the operator, and the side switch of the electronic pen is realized.

8 Claims, 4 Drawing Sheets

ELECTRONIC PEN WITH ELECTRONIC PEN BODY PART HAVING BUTTON SWITCH AND PUSHER PART INSERTED INTO INSERTION PART FORMED IN OPERATOR

BACKGROUND

Technical Field

The present disclosure relates to an electronic pen that enables input of information by indicating coordinates to, for example, a position detection device mounted on electronic equipment such as a tablet personal computer (PC).

Description of the Related Art

For example, in order to receive finer drawing input, some pieces of electronic equipment such as tablet PCs and advanced mobile phone terminals called smartphones are capable of receiving input from an electronic pen through a position detection device mounted on the electronic equipment. In view of a current situation where tablet PCs and advanced mobile phone terminals are often used while being carried, the electronic pen has been reduced in size to be more suitable for carrying.

For example, PCT Patent Publication No. WO2017/043214 (hereinafter, referred to Patent Document 1) discloses an invention related to an electronic pen body part that has the same shape and size as a refill of a commercially available ballpoint pen. The electronic pen body part can be used by being set in a casing of a ballpoint pen. Therefore, it is possible to realize an electronic pen that is easily carried and that can be used in a similar way to a ballpoint pen. In such an electronic pen having the electronic pen body part set in the casing of the ballpoint pen, it has been considered to use what is called a side switch. The side switch in the electronic pen means a depressing switch disposed on a side surface of the electronic pen such that a user who is holding the electronic pen can perform a depressing operation with his or her finger.

In Patent Document 1, two terminals are disposed on a side surface of the electronic pen body part. Patent Document 1 realizes a side switch that is turned on when the two terminals are connected to each other through an operator disposed on a side surface of the casing, and turned off when the two terminals are disconnected from each other. Since on/off of the side switch is switched by the connection/disconnection between the terminals, it is possible to realize the side switch even in what is called a knock-type ballpoint pen in which the electronic pen body part is extended from or housed in the casing of the ballpoint pen by a knocking operation.

In the case of the invention disclosed in Patent Document 1, it is conceivable that, due to the structure thereof, in some cases, the two terminals disposed on the electronic pen body part may not stably be connected to each other by the operator disposed on the casing of the ballpoint pen, for some reasons. For example, it is conceivable that the electric connection between the terminals may not appropriately be made because the positional relation between the two terminals and the operator is shifted or small dust or the like is interposed between the terminals and the operator. In such a case, the function as a side switch may not stably be implemented.

In addition, in the case of the invention disclosed in Patent Document 1, the operator is attached to the casing of the ballpoint pen, and it is difficult to remove the operator from the casing once it is attached thereto. It is necessary that the operator disposed on the electronic pen is not easily separated from the casing of the ballpoint pen when being used. However, it is desirable that the operator can easily be removed from the casing as needed for maintenance or the like of the electronic pen, for example.

BRIEF SUMMARY

In view of the above, it is desirable to provide an electronic pen that is excellent in portability by being reduced in size, that has a side switch functioning stably, and that is easy to maintain.

In order to solve the above problem, there is provided an electronic pen including an electronic pen body part having an electronic pen function, an outer casing that is a cylindrical body in which the electronic pen body part is housed, and an operator. The electronic pen body part includes a button switch on which a depressing operation is performed, and a bar-shaped pusher part that is fixed to a rear end side of the electronic pen body part, extends to a pen tip side of the electronic pen body part, and passes through an upper portion of the button switch. The outer casing includes a loading opening part that is formed in a rear end surface of the outer casing and through which the electronic pen body part is loaded into the outer casing, and an operator opening part that is formed in a side surface of the outer casing at a position corresponding to the button switch of the electronic pen body part loaded into the outer casing and placed at a fixed position. The operator includes an insertion part into which the pusher part is inserted when the electronic pen body part is loaded into the outer casing in a state where the operator is fitted into the operator opening part. The button switch of the electronic pen body part is depressed when the operator is depressed.

According to the electronic pen, the operator is fitted into the operator opening part of the outer casing, and the electronic pen body part is loaded from the loading opening part into the outer casing. The pusher part of the electronic pen body part is inserted into the insertion part of the operator. Accordingly, the operator is attached to the pusher part of the electronic pen body part in a state of being fitted into the operator opening part of the outer casing. The operator opening part of the outer casing is formed in the side surface thereof at a position corresponding to the button switch of the electronic pen body part being loaded into the outer casing and placed at a fixed position.

Thus, the button switch can reliably be depressed through the operator fitted into the operator opening part of the outer casing, and the side switch of the electronic pen that can always be depressed stably is realized. In addition, when the electronic pen body part is pulled out of the outer casing, the pusher part of the electronic pen body part is also detached from the insertion part of the operator, and it is also possible to easily remove the operator from the electronic pen. That is, the electronic pen that is easy to assemble and disassemble and that is easy to maintain is realized.

DETAILED DESCRIPTION

Hereinafter, an electronic pen according to an embodiment of the present disclosure will be described with reference to the drawings. The electronic pen according to the embodiment of the present disclosure is applicable to an electromagnetic-induction-type electronic pen and is also applicable to an active-capacitance-type electronic pen. In order to simplify the description, an example in which the electronic pen according to the embodiment of the present disclosure is applied to an electromagnetic-induction-type electronic pen will first be described below.

Figure 1:
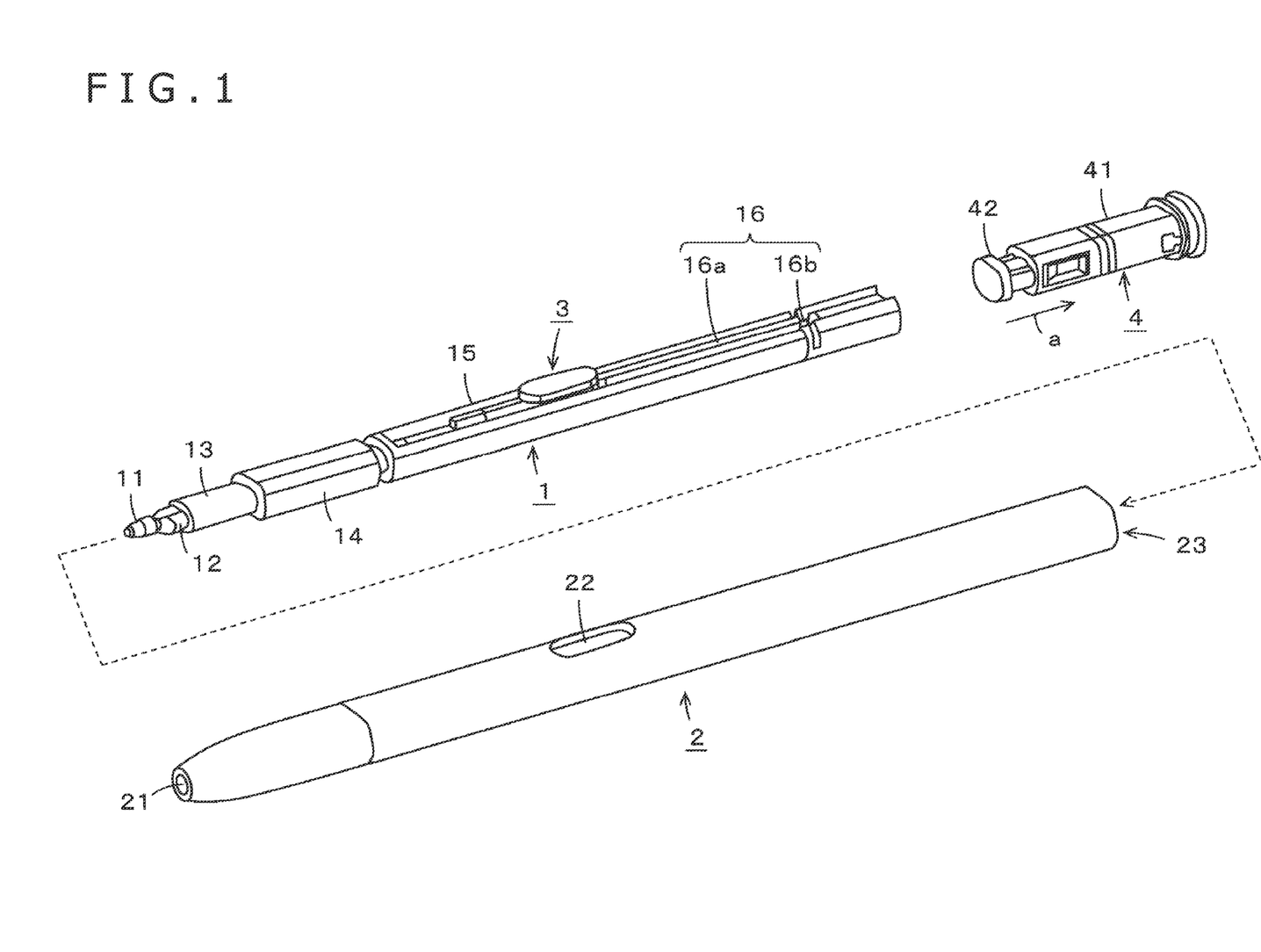
FIG. 1 is an exploded perspective view for explaining a configuration example of an electronic pen of an embodiment of the present disclosure.

FIG. 1 is an exploded perspective view for explaining a configuration example of the electronic pen of the embodiment. As illustrated in FIG. 1, the electronic pen of the present embodiment includes an electronic pen body part 1, an outer casing 2, a depressing operator 3 for operating a button switch, to be described later, that is disposed in the electronic pen body part 1, and an overload absorption part 4.

The electronic pen body part 1 has an electronic pen function and includes a core body 11, a ferrite core 12, a coil 13, a pen pressure detection part 14, and an inner casing 15. The core body 11 is a rod-shaped body including a pen tip part and a shaft part extending from a bottom surface of the pen tip part to the rear end side. The ferrite core 12 is pipe-shaped core including a through-hole passing through the center axis, and the shaft part of the core body 11 is inserted into the through-hole. The coil 13 is formed by winding an insulated conductor around a predetermined portion of a side surface of the ferrite core 12.

The pen pressure detection part 14 includes therein a variable-capacitance capacitor, and can be pressed by the core body 11 while the shaft part of the core body 11 penetrating through the through-hole of the ferrite core 12 abuts on the variable-capacitance capacitor. The core body 11 can slidably be moved in an axial direction thereof and can be pushed in and out of the through-hole of the ferrite core 12. The pen pressure detection part 14 detects the pen pressure being applied to the core body 11, on the basis of the capacitance of the variable-capacitance capacitor that changes according to the pressing by the core body 11.

As illustrated in FIG. 1, the inner casing 15 has what is called a half-pipe shape whose upper side is open. On the inner casing 15, a circuit substrate provided with the button switch to be described later is mounted, and a pusher member 16 to which the depressing operator 3 is attached is disposed. The pusher member 16 includes a pusher part 16*a* and a fixing part 16*b*, which will be described later in detail.

The fixing part 16*b* is fixed to the rear end side of the inner casing 15. Accordingly, the pusher member 16 is fixed to the electronic pen body part 1. The pusher part 16*a* is a rod-shaped part extending to the pen tip side to pass through an upper portion of the button switch disposed on the circuit substrate, without contacting with a portion of the electronic pen body part 1. In other words, the pusher part 16*a* extends in a rod shape (rail shape) to the tip end side in such a manner as to float above the circuit substrate mounted on the inner casing 15.

As illustrated in FIG. 1, the outer casing 2 is a hollow cylindrical body whose pen tip side (tip end side) is tapered (tapered shape). An end surface of the outer casing 2 on the tip end side is a tip end opening part 21 from which the pen tip part of the core body 11 protrudes, and an end surface of the outer casing 2 on the rear end side is a loading opening part 23 for loading the electronic pen body part 1. In addition, an operator opening part 22 is formed in a side surface of the outer casing 2 at a position corresponding to the button switch disposed in the electronic pen body part 1 being loaded into the outer casing 2 and placed at a fixed position inside the outer casing 2. In other words, the operator opening part 22 is formed in the side surface of the outer casing 2 at such a position that the button switch disposed in the electronic pen body part 1 can be depressed. The operator opening part 22 is an opening having the same shape as an upper surface of the depressing operator 3, but the size thereof is slightly larger than that of the upper surface of the depressing operator 3. Thus, the depressing operator 3 can be fitted in the operator opening part 22.

The depressing operator 3 has a similar shape to a rectangle whose short sides are formed into an arc shape, i.e., is substantially an oval in shape, when viewed from above. In a state of being fitted into the operator opening part 22, the depressing operator 3 has a thickness of wall parts that extend in a direction intersecting with the axial direction of the electronic pen, which will be described later in detail. In addition, the depressing operator 3 has an insertion part formed therein. The insertion part is a recess that is formed between the wall parts and that has an opening on the lower side, and extends in a direction along the axial direction of the electronic pen. Therefore, when the electronic pen body part 1 is loaded into the outer casing 2 from the loading opening part 23 in a state where the depressing operator 3 is fitted into the operator opening part 22 of the outer casing 2, the pusher part 16*a* of the pusher member 16 of the electronic pen body part 1 is inserted into the insertion part of the depressing operator 3.

Accordingly, the depressing operator 3 is attached to the pusher part 16*a* while being fitted into the operator opening part 22 of the outer casing 2, and hence does not detach from the electronic pen. As described above, the operator opening part 22 is formed in the side surface of the outer casing 2 at a position corresponding to the button switch disposed on the circuit substrate of the electronic pen body part 1 being loaded into the outer casing 2 and placed at a fixed position. Therefore, by depressing the depressing operator 3 fitted into the operator opening part 22, it is possible to depress the button switch disposed on the circuit substrate of the electronic pen body part 1. It should be noted that, when the depressing operator 3 is released, the rod-shaped pusher part 16*a* acts as a leaf spring with the fixing part 16*b* as a fulcrum, to return the depressing operator 3 to the original position thereof, as will be described later in detail.

The overload absorption part 4 has an elastic body housing part 41 in which, for example, a coil spring is housed as an elastic body, and a movable part 42 slidably attached to the elastic body housing part 41. In a normal state where no pressure is applied to the movable part 42 in a rear end direction indicated by an arrow a, the movable part 42 is pushed out of the elastic body housing part 41, and the coil spring of the elastic body housing part 41 is in a compressible state as illustrated in FIG. 1. In the present embodiment, in the normal state, when a pressure of less than 300 grams is applied to the movable part 42 in the direction indicated by the arrow a, the coil spring of the elastic body housing part 41 is not compressed. However, when a pressure of 300 grams or more is applied to the movable part 42 in the rear end direction indicated by the arrow a in this example, the coil spring of the elastic body housing part 41 is gradually compressed according to the pressure, and the movable part 42 is pushed into the elastic body housing part 41.

In the electronic pen of the present embodiment, the electronic pen body part 1 is loaded into the outer casing 2 such that the pen tip part of the core body 11 protrudes from the tip end opening part 21 of the outer casing 2. The overload absorption part 4 is loaded into the outer casing 2 from the loading opening part 23 and fixed to the outer casing 2 such that a tip end surface of the movable part 42 is brought into contact with a rear end surface of the electronic pen body part 1 loaded into the outer casing 2. Accordingly, the electronic pen body part 1 is also placed at a predetermined position in the outer casing 2. When the electronic pen is not in use, the movable part 42 of the overload absorption part 4 is pushed out of the elastic body housing part 41 as illustrated in FIG. 1, and the pen tip part of the core body 11 of the electronic pen body part 1 is kept protruding from the tip end opening part 21. The pen tip part is kept protruding from the tip end opening part 21 as long as the pressure (pen pressure) applied to the pen tip part of the core body 11 is less than 300 g (grams) while the electronic pen is used.

However, when the pressure (pen pressure) applied to the pen tip part of the core body 11 is 300 g or more, the coil spring of the elastic body housing part 41 is pressed and compressed (shrunk) by the electronic pen body part 1 through the movable part 42 of the overload absorption part 4, and the movable part 42 is pushed into the elastic body housing part 41. In response to this, the electronic pen body part 1 also slides and moves (sliding movement) to the rear end side, and the pen tip part of the core body 11 is housed in the outer casing 2. That is, the electronic pen of the present embodiment can be used without any problem when the pen pressure applied to the pen tip part of the core body 11 is less than 300 g. However, when the pen pressure becomes 300 g or more, the pen tip part of the core body 11 slides and moves to the inside of the outer casing 2 and is housed therein, and thus, the electronic pen cannot be used.

As described above, in the electronic pen of the present embodiment, the electronic pen body part 1 can slidably be moved in the outer casing 2 according to the pen pressure applied to the pen tip part of the core body 11. Accordingly, it is possible to prevent the electronic pen from applying an overload of 300 g or more to an operating surface of a tablet PC or an advanced mobile phone terminal. Therefore, the electronic pen of the present embodiment is suitable for a foldable terminal whose operating surface cannot be provided with a protective member such as tempered glass.

Figure 2A:
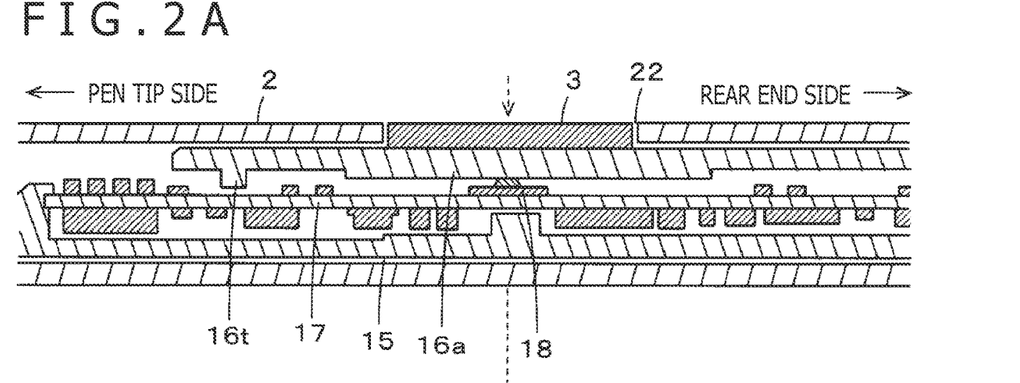
FIGS. 2A and 2B are cross-sectional views of an electronic pen of an embodiment of the present disclosure taken along an axis thereof and illustrating parts around a button switch part.
Figure 2B:
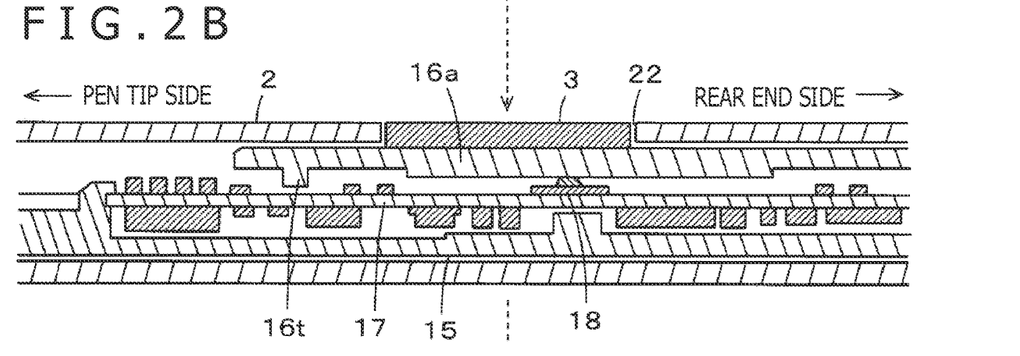
Figure 3:
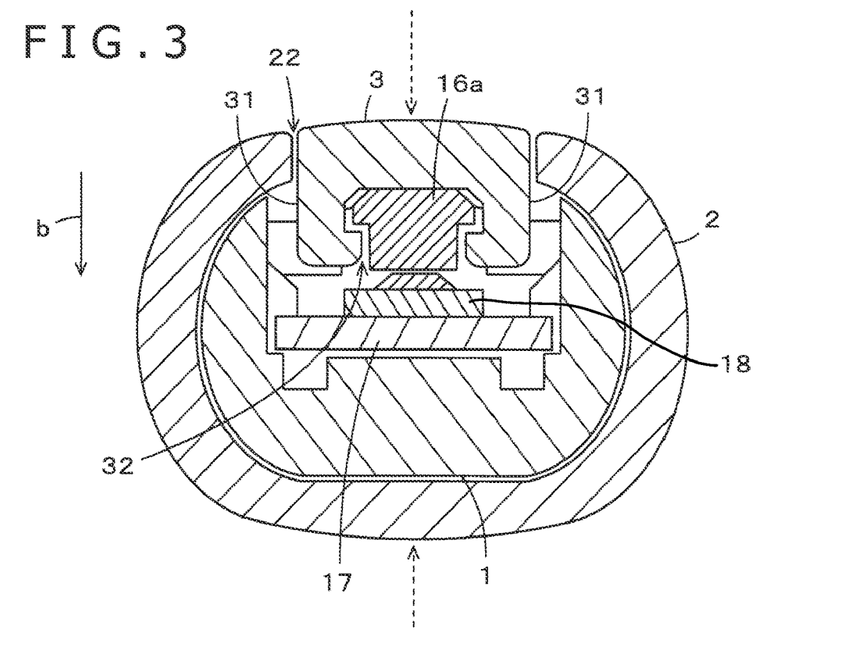
FIG. 3 is a cross-sectional view of the button switch part taken along a direction perpendicular to an axis of an electronic pen of an embodiment of the present disclosure.

FIGS. 2A and 2B are cross-sectional views of the electronic pen of the embodiment taken along an axis thereof and illustrating parts around the button switch part. In addition, FIG. 3 is a cross-sectional view of the button switch part taken along a direction perpendicular to the axis of the electronic pen of the embodiment. FIG. 2A illustrates a state where the pen tip part of the core body 11 protrudes from the tip end opening part 21 of the outer casing 2. In addition, FIG. 2B illustrates a state where a pen pressure of 300 g or more is applied to the pen tip part of the core body 11, the electronic pen body part 1 is moved to the rear end side, and the pen tip part of the core body 11 is housed in the outer casing 2. It should be noted that, since FIGS. 2A and 2B are cross-sectional views of the electronic pen taken along the axis thereof, FIGS. 2A and 2B do not illustrate wall parts 31, which will be described later, of the depressing operator 3 at positions indicated by dotted arrows in FIG. 3.

As illustrated in FIGS. 2A and 2B, a circuit substrate 17 having a double-sided substrate configuration is mounted on and fixed to the inner casing 15 of the electronic pen body part 1 loaded into the outer casing 2 that is a cylindrical body. A button switch 18 that is to be depressed by a user is mounted on the circuit substrate 17 together with, for example, various electronic components such as a capacitor and a control integrated circuit (IC). The button switch 18 of the present embodiment is turned off when it is not depressed, and turned on when it is depressed.

The pusher part 16a is disposed on the upper side of the button switch 18. The pusher part 16a is a bar-shaped part extending to the pen tip side to pass through an upper portion of the button switch 18 without contacting with a portion of the electronic pen body part 1. In a surface of the pusher part 16a facing the circuit substrate 17, recesses are formed at positions that are possibly brought into contact with electronic components and the like other than the button switch 18 on the circuit substrate 17 when the pusher part 16a is depressed. Accordingly, even when the pusher part 16a is depressed and comes closer to the circuit substrate 17, the pusher part 16a is not brought into contact with the electronic components and the like. In addition, a protrusion part 16t is formed at a portion, on the pen tip side, of the surface of the pusher part 16a facing the circuit substrate 17 and functions as a stopper to prevent the pusher part 16a from lowering more than necessary. The depressing operator 3 fitted into the operator opening part 22 of the outer casing 2 is attached to the pusher part 16a as described above.

As described above, the depressing operator 3 has a similar shape to a rectangle whose short sides are formed into an arc shape when viewed from above. In a state of being fitted into the operator opening part 22, the depressing operator 3 has the wall parts 31 extending in a direction indicated by an arrow b in FIG. 3 that is the direction intersecting with the axial direction of the electronic pen. The depressing operator 3 also has an insertion part 32 formed therein. The insertion part 32 is a recess formed between the wall parts 31 and extends along the axial direction of the electronic pen, as illustrated in FIG. 3. The insertion part 32 has a T-shaped cross section and becomes narrower towards the opening. In addition, as illustrated in FIG. 3, the cross section of the pusher part 16a of the electronic pen body part 1 in the present embodiment has a T-shape that is slightly smaller than that of the insertion part 32 of the depressing operator 3.

Therefore, when the electronic pen is assembled, the depressing operator 3 is first fitted into the operator opening part 22 of the outer casing 2. Next, while the pusher part 16a of the electronic pen body part 1 is positioned on the side of the depressing operator 3, the electronic pen body part 1 is loaded from the loading opening part 23 into the outer casing 2. Accordingly, as illustrated in FIG. 3, the pusher part 16a of the electronic pen body part 1 is inserted into the insertion part 32 of the depressing operator 3, and the depressing operator 3 is attached to the pusher part 16a.

That is, the pusher part 16a that has the T-shaped cross section slightly smaller than that of the insertion part 32 is inserted into the insertion part 32 of the depressing operator 3. Accordingly, the depressing operator 3 is attached to the pusher part 16a such that the depressing operator 3 will not detach from the pusher part 16a, as illustrated in FIG. 3. When the state illustrated in FIG. 3 is viewed from a side surface of the electronic pen, it corresponds to the state illustrated in FIG. 2A. In this state, by depressing the depressing operator 3, it is possible to depress the button switch 18 disposed on the circuit substrate 17 of the electronic pen body part 1.

In addition, in the state illustrated in FIG. 2A, when a pen pressure of 300 g or more is applied to the pen tip part of the core body 11 of the electronic pen body part 1, it is assumed that the entire electronic pen body part 1 slides and moves to the rear end side as illustrated in FIG. 2B. In this case, the depressing operator 3 is not moved with respect to the outer casing 2 because it is fitted into the operator opening part 22 of the outer casing 2. However, as illustrated by dotted arrows in FIGS. 2A and 2B, the sliding movement of the electronic pen body part 1 moves the button switch 18 to a position shifted to the rear end side relative to the center position of the depressing operator 3 in the longitudinal direction.

As illustrated in FIG. 2B, even if the electronic pen body part 1 slides and moves to the rear end side, the depressing operator 3 does not detach from the pusher part 16a of the electronic pen body part 1 because the pusher part 16a only moves to the rear end side in the insertion part 32 of the depressing operator 3. Thus, the depressing operator 3 is kept attached to the pusher part 16a while keeping a state of being fitted into the operator opening part 22 of the outer casing 2. Thus, even if an overload of 300 g or more is applied to the core body 11 and the electronic pen body part 1 slides and moves to the rear end side, it is possible to stably keep a state where the depressing operator 3 is attached to the electronic pen.

It is assumed that the depressing operator 3 is attached to the pusher part 16a as illustrated in FIG. 3 and that the center of the depressing operator 3 in the longitudinal direction is positioned at the button switch 18 mounted on the circuit substrate 17 of the electronic pen body part 1 as illustrated in FIG. 2A. In this case, when the depressing operator 3 is depressed, the button switch 18 can be depressed through the depressing operator 3 and the pusher part 16a as described above. In addition, when the depressing operator 3 is released, the pusher part 16a acts as a leaf spring and returns to the original position where the pusher part 16a was positioned before being depressed.

Accordingly, the pusher part 16a can push up the depressing operator 3 to return the depressing operator 3 to the original position where the depressing operator 3 was positioned before the depressing operation.

Figure 4A:
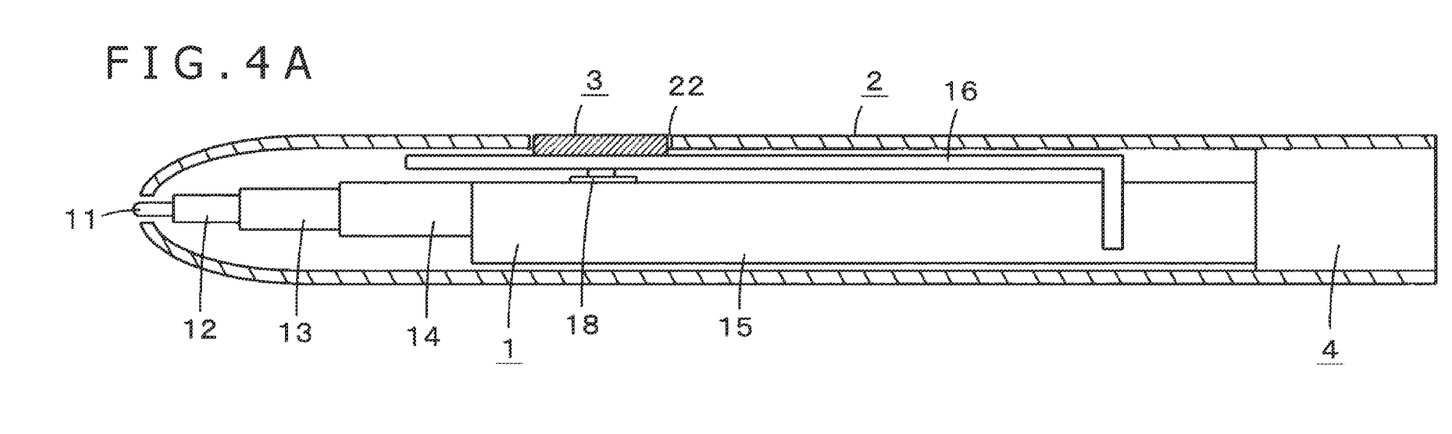
FIGS. 4A to 4C are diagrams for schematically illustrating a configuration example of an electronic pen of an embodiment of the present disclosure.
Figure 4B:
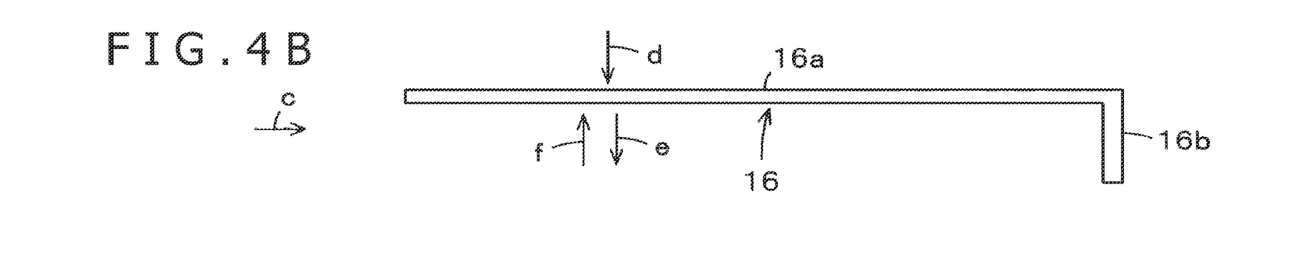
Figure 4C:
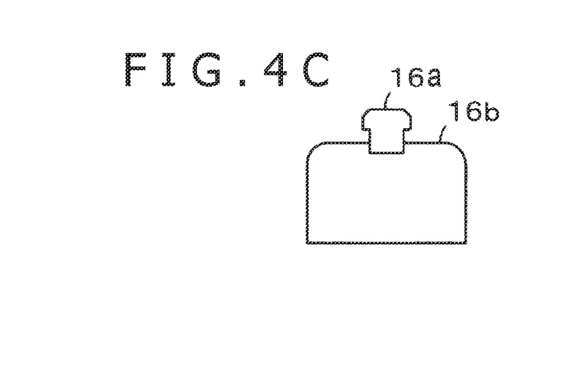

FIGS. 4A to 4C are diagrams for schematically illustrating a configuration example of the electronic pen of the present embodiment. FIG. 4A illustrates the inside of the electronic pen by cutting the outer casing 2 and the depressing operator 3 of the electronic pen of the present embodiment in half in the axial direction and removing the front side. FIG. 4B illustrates only the pusher member 16 taken out of the electronic pen body part 1. FIG. 4C illustrates the pusher member 16 when viewed from a direction indicated by an arrow c of FIG. 4B.

As described above and as illustrated in FIG. 4A, the electronic pen body part 1 and the overload absorption part 4 are loaded into the outer casing 2. The electronic pen body part 1 includes the core body 11, the ferrite core 12, the coil 13, the pen pressure detection part 14, the inner casing 15, and the pusher member 16, and the circuit substrate 17 on which electronic components such as the button switch 18, a capacitor, and a control IC are mounted is housed in the inner casing 15.

As illustrated in FIGS. 4A and 4B, the pusher member 16 includes the pusher part 16a and the fixing part 16b that form an L-shape when viewed from the side surface side. That is, the pusher member 16 has a shape in which a rear end of the pusher part 16a is connected to an upper end of the fixing part 16b. When the pusher member 16 is viewed from the direction indicated by the arrow c of FIG. 4B, the fixing part 16b is a substantially rectangular plate-like member, and the rod-shaped pusher part 16a having a T-shape is disposed at the center of the upper end of the fixing part 16b, as illustrated in FIG. 4C.

The pusher member 16 is fixed to the electronic pen body part 1 by inserting the fixing part 16b into, for example, slits formed in left and right portions of the inner casing 15 on the rear end side. The pusher member 16 is formed of, for example, a hard resin such as plastic, and at least part of the pusher part 16a has an elastic force in a direction intersecting with the longitudinal direction with the fixing part 16b as a fulcrum. That is, as illustrated in FIG. 4B, when the pusher part 16a is depressed as indicated by an arrow d, the pusher part 16a is lowered in a direction indicated by an arrow e with the fixing part 16b as a fulcrum, and the button switch 18 is depressed. When the pusher part 16a which is depressed in the direction indicated by the arrow d is released, the pusher part 16a returns to the original position thereof by the elastic force acting in a direction indicated by an arrow f.

As described above, the pusher member 16 functions as what is called a leaf spring in such a manner that, with the fixing part 16b as a fulcrum, the pusher member 16 is lowered when the pusher part 16a is depressed, and returns to the original position thereof by the elastic force when the pusher part 16a is released. Thus, the button switch 18 on the circuit substrate of the electronic pen body part 1, the pusher member 16 of the electronic pen body part 1, and the depressing operator 3 form a side switch that is to be operated by a user of the electronic pen and that is disposed on the side surface of the electronic pen. The side switch of the electronic pen of the present embodiment is turned on when it is depressed, and turned off when the it is released.

Figure 5:
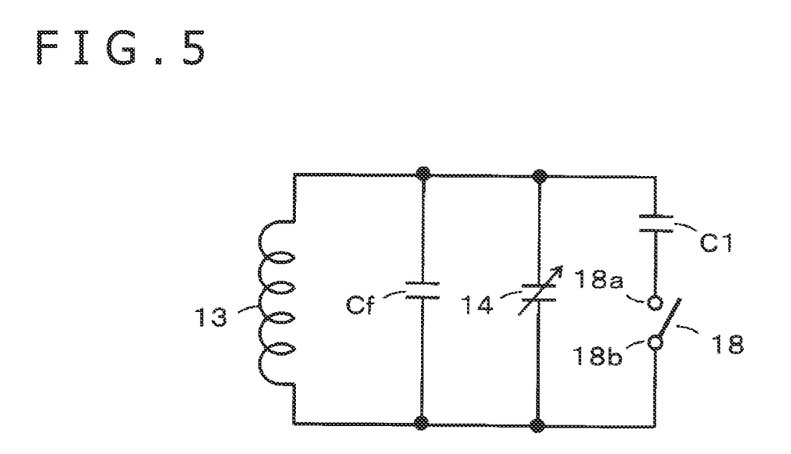
FIG. 5 is a diagram for illustrating an equivalent circuit of an electromagnetic-induction-type electronic pen of an embodiment of the present disclosure.

FIG. 5 is a diagram for illustrating an equivalent circuit of the electromagnetic-induction-type electronic pen of the present embodiment. The electronic pen of the present embodiment has a resonant circuit in which the coil (inductor) 13, a capacitor Cf, the pen pressure detection part 14 including a variable-capacitance capacitor, and a capacitor C1 for changing the frequency are connected in parallel. The electronic pen of the present embodiment includes the button switch 18 for switching whether or not to connect the capacitor C1 for changing the frequency to the resonant circuit. The button switch 18 is simply turned on when a contact point 18a and a contact point 18b are connected to each other, and turned off when they are disconnected.

Accordingly, the connection/disconnection between the capacitor C1 and the resonant circuit can be switched when on/off of the button switch 18 is switched through the depressing operator 3. Thus, the frequency of a signal generated by the resonant circuit can be changed between the case where the capacitor C1 is connected to the resonant circuit and the case where the capacitor C1 is not connected to the resonant circuit, and the two states of the case where the capacitor C1 is connected to the resonant circuit and the case where the capacitor C1 is not connected to the resonant circuit can be notified to a position detection device.

It should be noted that the electromagnetic-induction-type electronic pen indicates its position by transmitting and receiving a magnetic field to and from the position detection device. That is, the position detection device includes a sensor part in which multiple loop coils are arranged in each of the X-axis direction and the Y-axis direction. A transmission period in which electric power is sequentially supplied to the multiple loop coils of the sensor part to generate a magnetic field and a reception period in which the supply of the electric power is stopped to receive a magnetic field from the outside are alternately provided. The corresponding electronic pen has, as described above, the resonant circuit including the coil and the capacitor, and in response to the magnetic field from the sensor part, a current flows through the coil to generate a magnetic field (signal). Then, the electronic pen includes pen pressure information in the magnetic field and transmits it to the position detection device. When the position detection device receives the magnetic field from the electronic pen in the reception period, the position detection device can detect the position indicated by the electronic pen and the pen pressure.

Effect of Embodiment

According to the electronic pen of the above-described embodiment, the side switch of the electronic pen includes the depressing operator 3, the pusher member 16, and the button switch 18. Thus, the side switch that can reliably be operated and stably functions can be realized. In this case, the depressing operator 3 is fitted into the operator opening part 22 formed in the side surface of the outer casing 2, and the electronic pen body part 1 is loaded from the loading opening part 23 into the outer casing 2, so that the depressing operator 3 is attached to the pusher part 16a of the electronic pen body part 1. Thus, the depressing operator 3 is easily attached to the electronic pen body part 1, and the side switch can be realized. In addition, the side switch that stably functions can be provided even in the case where the electronic pen is configured by loading the electronic pen body part 1 into the outer casing 2.

In addition, when the electronic pen body part 1 is pulled out from the outer casing 2, the pusher part 16a of the pusher member 16 is pulled from the insertion part 32 of the depressing operator 3 fitted into the operator opening part 22, so that the depressing operator 3 can easily be removed from the electronic pen. That is, the electronic pen that can easily be assembled and disassembled and that can easily be maintained can be realized.

Modified Example and the Like

In the above-described embodiment, the depressing operator 3 includes the insertion part 32 that is a T-shaped recess having an opening on the lower side, but the present disclosure is not limited to this. The shape of the insertion part 32 can variously be determined. According to the shape of the insertion part 32, the cross-sectional shape of the pusher part 16a of the pusher member 16 is also determined. In short, in the case where the pusher part 16a of the pusher member 16 is inserted into the insertion part 32 of the depressing operator 3, it is only necessary that the pusher part 16a is not easily detached.

Thus, the insertion part 32 of the depressing operator 3 may be a through-hole with no opening on the lower side, instead of being the recess. In this case, it is only necessary that the pusher part 16a of the pusher member 16 has a similar shape to that of the insertion part 32 of the depressing operator 3. In addition, in this case, the button switch 18 is depressed by the depressing operator 3, so that the pusher member 16 acts as a leaf spring to return the depressing operator 3 to the original position.

In addition, the electronic pen of the above-described embodiment includes the overload absorption part 4 on the rear end side of the electronic pen body part 1. Thus, the electronic pen body part 1 is slid and moved when a pressure of 300 grams or more is applied to the core body 11, and the pen tip part of the core body 11 is housed in the outer casing 2. The reference value for the overload in this case is not limited to 300 g, and various values can be used. In addition, the present disclosure can also be applied to a knock-type electronic pen that includes a knocking mechanism of an electronic pen body part instead of the overload absorption part 4. This is because the electronic pen of the above-described embodiment and the knock-type electronic pen have the same configuration of the sliding movement of the electronic pen body part 1.

In addition, in the above-described embodiment, the button switch disposed on the circuit substrate 17 of the electronic pen body part 1 is turned on when it is depressed, and turned off when it is not depressed. However, the button switch is not limited to this, and what is called a toggle-type button switch can also be used. When the toggle-type button switch is depressed, it is turned on and keeps the on-state, and when the toggle-type button switch is depressed again, it is turned off and keeps the off-state.

Figure 6:
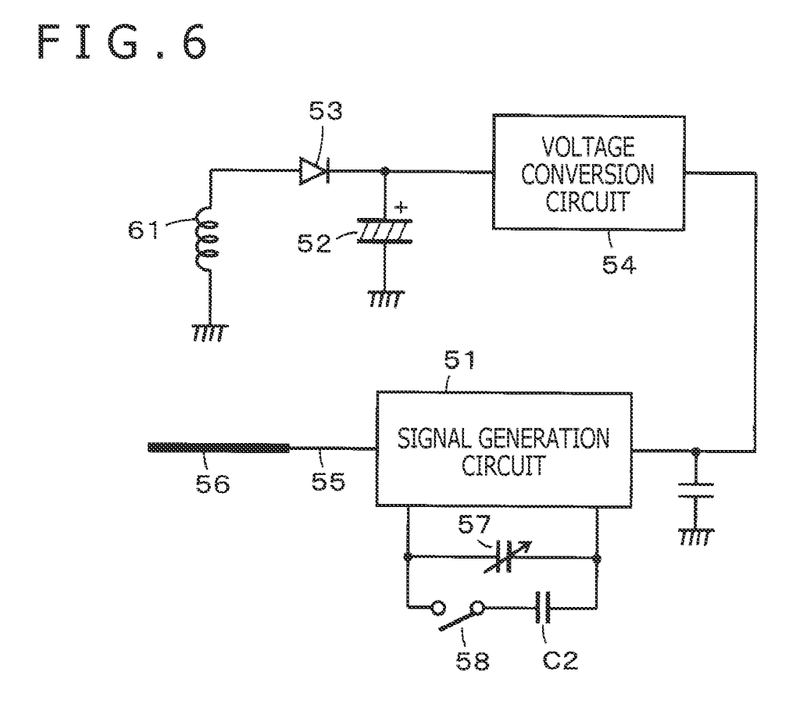
FIG. 6 is a diagram for illustrating an equivalent circuit in the case where an electronic pen of an embodiment of the present disclosure is configured as an active-capacitance-type electronic pen.

In addition, the present disclosure can also be applied to an active-capacitance-type electronic pen. FIG. 6 is a diagram for illustrating an equivalent circuit in the case where the electronic pen of the present disclosure is configured as an active-capacitance-type electronic pen. A core body 56 is configured as an electrode core made of a hard resin mixed with a conductor such as conductive metal or conductive powders. In the following description, the core body 56 is referred to as an electrode core 56. The electronic circuit formed on the circuit substrate has the configuration illustrated in FIG. 6. That is, the electronic circuit has a circuit configuration including a signal generation circuit 51, an electric double-layer capacitor 52 as an example of a storage element that generates a driving voltage (power supply voltage) for driving the signal generation circuit 51, a rectifier diode 53, and a voltage conversion circuit 54. The signal generation circuit 51 includes an oscillation circuit in this example.

The electrode core 56 can be inserted into the through-hole of the ferrite core to press a pen pressure detection part 57 as in the case of the electronic pen of the above-described embodiment. The electrode core 56 is electrically connected to the signal generation circuit 51 on the circuit substrate through a connection line 55. As illustrated in FIG. 6, the pen pressure detection part 57 is electrically connected to the signal generation circuit 51 formed on the circuit substrate. The oscillation circuit configuring the signal generation circuit 51 generates a signal whose frequency changes according to the capacitance of the pen pressure detection part 57 configured as a variable-capacitance capacitor, and supplies the generated signal to the electrode core 56.

Further, a capacitor C2 and a button switch 58 are connected in parallel to the signal generation circuit 51. A side switch includes the button switch 58 as in the case of the electronic pen of the above-described embodiment. That is, the configuration illustrated in FIG. 6 is the configuration of an active-capacitance-type electronic pen body part loaded into the outer casing 2. The active-capacitance-type electronic pen body part includes the pusher member 16 as in the case of the above-described electronic pen. Accordingly, the active-capacitance-type electronic pen in which the depressing operator fitted into the operator opening part 22 of the outer casing 2 is attached to the pusher member 16 and the button switch 58 can be depressed through the depressing operator and the pusher part 16a can be configured.

It should be noted that, in the capacitance type, a position detection device includes a sensor part in which multiple linear conductors (line electrodes) are arranged in each of the X-axis direction and the Y-axis direction, and detects an indicated position according to a change in the capacitance (charge) generated in the linear conductors. Thus, the active-capacitance-type electronic pen includes pen pressure information in a signal from the signal generation circuit mounted in the active-capacitance-type electronic pen and transmits the signal to the position detection device, and the position detection device receives the signal and detects the position indicated by the electronic pen and the pen pressure. Further, since the frequency of the signal transmitted from the active-capacitance-type electronic pen can also be changed according to on/off of the button switch 58, on/off of the button switch 58 can also be indicated to the position detection device side.

It should be understood by those skilled in the art that various modifications, combinations, sub-combinations and alterations may occur depending on design requirements and other factors insofar as they are within the scope of the appended claims or the equivalents thereof

The invention claimed is:

1. An electronic pen comprising:
   an electronic pen body part having an electronic pen function;
   an outer casing that is a cylindrical body in which the electronic pen body part is housed; and
   an operator,
   wherein the electronic pen body part includes:
      a button switch on which a depressing operation is performed, and
      a bar-shaped pusher part that is fixed to a rear end side of the electronic pen body part, extends to a pen tip side of the electronic pen body part, and passes through an upper portion of the button switch,
   wherein the outer casing includes:
      a loading opening part that is formed in a rear end surface of the outer casing and through which the electronic pen body part is loaded into the outer casing, and
      an operator opening part that is formed in a side surface of the outer casing at a position corresponding to the button switch of the electronic pen body part loaded into the outer casing and placed at a fixed position,
   wherein an insertion part is formed in the operator,
   wherein the pusher part is inserted into the insertion part formed in the operator when the electronic pen body part is loaded into the outer casing in a state where the operator is fitted into the operator opening part, and
   wherein the button switch of the electronic pen body part is depressed by the pusher part when the operator is depressed.

2. The electronic pen according to claim 1, wherein when the operator is released, the pusher part functions as a leaf spring, the pusher part and the operator return to states before they are depressed, and the button switch is released.

3. The electronic pen according to claim 1, wherein when the operator is depressed, the button switch of the electronic pen body part is depressed by the pusher part.

4. The electronic pen according to claim 1, wherein when the operator is depressed, the button switch of the electronic pen body part is depressed by the operator attached to the pusher part.

5. The electronic pen according to claim 1, further comprising:
   an overload absorption part disposed on the rear end side of the electronic pen body part loaded into the outer casing,
   wherein:
      a pen tip of the electronic pen body part is loaded into the outer casing protrudes from a tip end part of the outer casing,
      when a pen pressure of a predetermined value or more is applied to the pen tip, the electronic pen body part slides and moves toward a rear end side of the outer casing by a function of the overload absorption part to house the pen tip in the outer casing, and
      the pusher part inserted into the insertion part of the operator fitted into the operator opening part slides and moves along with sliding movement of the electronic pen body part, and the operator remains attached to the pusher part while being fitted into the operator opening part of the outer casing.

6. The electronic pen according to claim 1, wherein the operator includes wall parts that extend in a direction intersecting an axial direction of the electronic pen, and wherein the insertion part is a recess formed between the wall parts.

7. The electronic pen according to claim 1, wherein each of the insertion part and the pusher part has a T-shaped cross section in direction perpendicular to an axis of an electronic pen.

8. The electronic pen according to claim 1, wherein the pusher part is part of a pusher member including a fixing part that is fixed to a rear end side of the electronic pen body part, and wherein the pusher part and the fixing part form an L-shape when viewed from a side of the electronic pen.

* * * * *